United States Patent
Ballu

(10) Patent No.: US 10,828,652 B2
(45) Date of Patent: Nov. 10, 2020

(54) NOZZLE SUPPORT DEVICE HAVING A ROTARY NOZZLE CARRYING HEAD

(71) Applicant: EXEL INDUSTRIES, Paris (FR)

(72) Inventor: Patrick Jean Marie Ballu, Reims (FR)

(73) Assignee: EXEL INDUSTRIES, Paris (FR)

( * ) Notice: Subject to any disclaimer, the term of this patent is extended or adjusted under 35 U.S.C. 154(b) by 0 days.

(21) Appl. No.: 14/893,052

(22) PCT Filed: May 15, 2014

(86) PCT No.: PCT/FR2014/051133
§ 371 (c)(1),
(2) Date: Nov. 21, 2015

(87) PCT Pub. No.: WO2014/188110
PCT Pub. Date: Nov. 27, 2014

(65) Prior Publication Data
US 2016/0121356 A1  May 5, 2016

(30) Foreign Application Priority Data
May 22, 2013 (FR) .................................. 13 54606

(51) Int. Cl.
*B05B 3/02* (2006.01)
*B05B 12/08* (2006.01)
(Continued)

(52) U.S. Cl.
CPC .............. *B05B 3/02* (2013.01); *A01M 7/006* (2013.01); *B05B 1/1645* (2013.01); *B05B 1/28* (2013.01);
(Continued)

(58) Field of Classification Search
CPC ....... B05B 15/069; B05B 3/02; B05B 12/088; B05B 15/00; B05B 1/1645; B05B 1/28;
(Continued)

(56) References Cited

U.S. PATENT DOCUMENTS 2,429,779 A   10/1947 Stine
5,529,758 A   6/1996 Houston
(Continued)

FOREIGN PATENT DOCUMENTS

DE   202004011673 U1   11/2004
EP        2047912 A1    4/2009
(Continued)

OTHER PUBLICATIONS

International Search Report dated Jul. 23, 2014 re: Application No. PCT/FR2014/051133; citing: FR 2 264 612 A1, FR 2 290 254 A1, US 5 529 758 A, DE 20 2004 011673 U1, EP 2 047 912 A1, FR 2 655 571 A1, FR 2 558 922 A1, EP 2 669 014 A1, EP 2 606 722 A1 A, and US 2 429 779 A.

Primary Examiner — Qingzhang Zhou
(74) Attorney, Agent, or Firm — Cantor Colburn LLP

(57) ABSTRACT

The invention concerns a nozzle support device (10) comprising a body (12) that has a fluid inlet passage (24) and at least one outlet passage (26), and that comprises a revolving section that forms a hub (16) that extends around a rotational axis (A), a nozzle-carrying head (14) that is rotatably mounted on the hub (16) of the body (12) around the rotational axis (A), and that is designed to simultaneously carry at least two nozzles, and immobilising means (74, 86) for immobilising the nozzle-carrying head (14) in rotation on the body (12) in a plurality of predefined positions, characterised in that the device (10) is provided with a mechanism for rotating the nozzle-carrying head (14) comprising an oscillating drive member (90) provided with at least one retractable drive pawl that has one free end designed to push the drive teeth in succession.

11 Claims, 3 Drawing Sheets

(51) Int. Cl.
    *A01M 7/00*     (2006.01)
    *B05B 1/28*     (2006.01)
    *F16K 11/085*     (2006.01)
    *F16K 31/163*     (2006.01)
    *B05B 1/16*     (2006.01)
    *B05B 1/30*     (2006.01)
    *B05B 15/00*     (2018.01)
    *G05D 16/06*     (2006.01)
    *G05D 16/18*     (2006.01)
    *F16K 7/17*     (2006.01)
    *F16K 23/00*     (2006.01)
    *B05B 15/658*     (2018.01)
    *B05B 15/50*     (2018.01)

(52) U.S. Cl.
    CPC .......... *B05B 1/3006* (2013.01); *B05B 12/088* (2013.01); *B05B 15/00* (2013.01); *B05B 15/50* (2018.02); *B05B 15/658* (2018.02); *F16K 7/17* (2013.01); *F16K 11/0853* (2013.01); *F16K 23/00* (2013.01); *F16K 31/1635* (2013.01); *G05D 16/0655* (2013.01); *G05D 16/185* (2013.01)

(58) Field of Classification Search
    CPC .... B05B 1/3006; B05B 15/02; G05D 16/185; G05D 16/0655; A01M 7/006; F16K 31/1635; F16K 11/0853
    USPC ....... 239/393, 392, 444, 448, 449, 525, 526, 239/436; 137/312, 625.47
    See application file for complete search history.

(56) References Cited

U.S. PATENT DOCUMENTS

| | | | | |
|---|---|---|---|---|
| 2007/0095933 | A1* | 5/2007 | Ehresman | ................. E04H 4/14 239/18 |
| 2014/0263756 | A1* | 9/2014 | Meehan | ................. B05B 1/1627 239/446 |

FOREIGN PATENT DOCUMENTS

| | | | |
|---|---|---|---|
| EP | 2606722 | A1 | 6/2013 |
| EP | 2669014 | A1 | 12/2013 |
| FR | 2264612 | A1 | 10/1975 |
| FR | 2290254 | A1 | 6/1976 |
| FR | 2558922 | A1 | 8/1985 |
| FR | 2655571 | A1 | 6/1991 |

\* cited by examiner

NOZZLE SUPPORT DEVICE HAVING A ROTARY NOZZLE CARRYING HEAD

TECHNICAL FIELD

The invention relates to a nozzle-carrying device which is equipped with a nozzle-carrying head rotatably mounted between a plurality of predetermined positions.

BACKGROUND

This type of nozzle-carrying device is generally used in a liquid spray plant, for which it is necessary to have nozzles of several shapes or sizes that can be instantaneously switched.

Such a nozzle carrier, described and shown in document FR-A-2655571 for example, usually includes a body which has an inlet passage of a fluid and at least one outlet passage, and which includes a revolution section forming a hub which extends around an axis of rotation.

In addition, a nozzle-carrying head, which is designed to simultaneously carry at least two nozzles, is rotatably mounted on the hub of the body around the axis of rotation.

Complementarily, the nozzle-carrying head is rotatably immobilized on the body by immobilizing means, in a plurality of predetermined positions in at least some of them one of the nozzles is linked to the outlet passage of the body.

The immobilizing means are designed to allow switching a nozzle with another, or from a predetermined position with another, by a simple rotation of the nozzle-carrying head.

According to this type of nozzle-carrying device, the rotation of the nozzle-carrying head is manually performed, which requires the intervention of an operator on the nozzle-carrying head.

BRIEF SUMMARY

The invention particularly aims to provide a nozzle-carrying device for driving the nozzle-carrying head from one position to another by means of an actuator, so that the nozzle-carrying head is suitable for being remotely driven in rotation.

For this purpose, the invention provides a nozzle-carrying device of the type including:
- a body which has a fluid inlet passage and at least one outlet passage, and which includes a revolution section forming a hub that extends around an axis of rotation,
- a nozzle-carrying head which is rotatably mounted on the hub of the body around the axis of rotation, and which is designed to simultaneously carry at least two nozzles, and
- immobilizing means for rotatably immobilizing the nozzle-carrying head on the body in a plurality of predetermined positions, in at least some of them one of the nozzles is linked to the outlet passage of the body, characterized in that the device is equipped with a mechanism for driving the nozzle-carrying head in rotation including:
- a plurality of drive teeth which are regularly arranged around the axis of rotation on the nozzle-carrying head,
- a drive element equipped with at least one retractable drive pawl which has a free end suitable for successively pushing the drive teeth, the drive element being mounted in oscillatory manner on the body, around the axis of rotation, according to a forward motion during which the pawl incrementally drives the nozzle-carrying head to a predetermined position by cooperation with one of the drive teeth, and a return motion during which the pawl is retracted,
- an actuator including an actuating rod which is movably connected on the drive element for driving the drive element in oscillatory motion.

The drive mechanism allows driving the nozzle-carrying head into each of its predetermined positions without manual intervention.

The actuator is a cylinder which drives in displacement the actuating rod along a direction perpendicular to the axis of rotation between an extended position and a retracted position, the actuating rod being equipped with a connecting catch which extends parallel to the axis of rotation and which has a free end cooperating with a complementary housing delimited by the drive element, so as to drive the drive element in oscillatory displacement via a back and forth motion of the actuating rod.

The cylinder is an actuator with the advantage of being space-saving and that it can be supplied by a fluid such as compressed air.

According to another feature, the drive element has the shape of an annular ring which is removably mounted in oscillatory manner on the hub of the body, around the axis of rotation.

This feature offers the possibility to withdraw the drive element, particularly to replace it in case of breakage, or to mount the nozzle-carrying device in a manual configuration in which it is devoid of the drive mechanism.

Also, the pawl has a circular arc shape which generally extends around the axis of rotation, from an elastically deformable sub plate, to a free end suitable for successively pushing the drive teeth, around the axis of rotation.

Such a design allows obtaining a pawl which is radially retractable by elastic deformation and which can be made in one piece with the drive element.

According to another aspect, the immobilizing means include an annular immobilizing ring including at least one immobilizing element which has a radial protrusion designed to cooperate with a set of complementary cavities, each delimited on the nozzle-carrying head so as to incrementally immobilize said head in its predetermined positions, the protrusion being radially retractable for allowing the rotation of the nozzle-carrying head between two predetermined positions.

In addition, the immobilizing ring includes securing means in rotation on the hub of the body, around the axis of rotation, in form-fitting manner, and said securing means are designed to allow dismantling the immobilizing ring on the associated body.

This feature particularly allows replacing the immobilizing ring and also allows dismantling the other parts mounted on the hub of the body.

According to another aspect, the nozzle-carrying device includes an anti-drop device comprising:
- a first chamber in which the inlet passage and the outlet passage open into each other,
- a second chamber juxtaposed to the first chamber,
- a first blocking membrane which is designed to be driven in a closed position in which it interrupts communication between the inlet passage and the outlet passage, and a second blocking membrane which abuts with the first membrane and which has an area larger than the area of the first membrane, the assembly constituted by the first membrane and the second membrane being interposed between the first chamber and the second chamber, a control member which allows increasing the pressure in the second chamber such that the second membrane applies a force on the first membrane to drive the first membrane in its closed position.

The area difference between the first membrane and the second membrane allows multiplying the force exerted on the second membrane, whereby it is possible to reduce the necessary and sufficient pressure in the second chamber to drive the first membrane in its closed position.

In addition, the nozzle-carrying device includes:
- a first tubular stopper which is screwed onto the body and which delimits a first annular clamping section axially plating a peripheral edge of the first membrane against a shoulder formed in the body, and an axial abutment axially blocking the nozzle-carrying head on the body, and
- a second blind stopper which is screwed onto the first stopper and which includes a second annular clamping section axially plating a peripheral edge of the second membrane against a shoulder formed in the first stopper.

Furthermore, the second stopper is equipped with a first grip allowing for its manual unscrewing, and a second grip suitable for cooperating with a tool for unscrewing the second stopper.

Also, the second stopper includes a first insert forming connection for supplying fluid under pressure to the second chamber, and a second insert forming connection for supplying fluid under pressure to an additional nozzle-carrying device from the second chamber.

This feature improves the compactness and promotes the mounting in series of the nozzle-carrying device with other devices.

According to another aspect, the nozzle-carrying device includes a lighting device designed to illuminate at least the spray spectrum of the fluid ejected by the nozzle-carrying device.

Finally, the nozzle-carrying device includes a cleaning element which is arranged in the inlet passage to cause the fluid to become turbulent partially opposing its flow.

BRIEF DESCRIPTION OF THE DRAWINGS

Other features and advantages of the invention will appear upon reading the following detailed description for the comprehension of which reference is made to the accompanying drawings in which.

DETAILED DESCRIPTION

In the description and claims, to clarify the description and claims, a non-limiting terminology will be adopted, longitudinal, vertical and transverse in reference to the trihedron L, V, T indicated in the figures, the longitudinal direction of which is parallel to the axis A of the nozzle-carrying device.

Also, in a non limiting manner, the expressions "axial" and "radial" will be used to refer to a direction parallel to the axis of rotation A and a direction perpendicular to the axis A of rotation, respectively.

Figure 1:
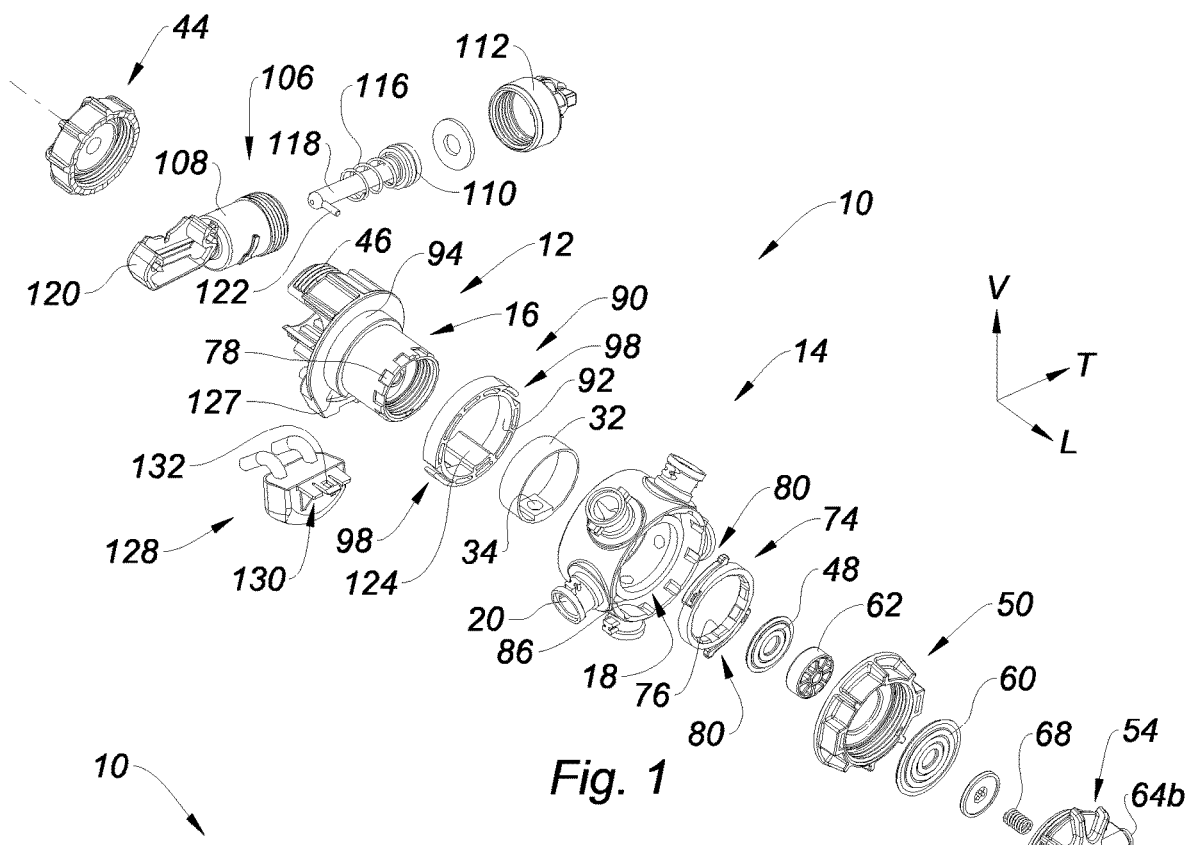
FIG. 1 is an exploded perspective view, which illustrates a nozzle-carrying device provided with a mechanism for driving the nozzle-carrying head, according to the invention.

There is shown in FIG. 1 a nozzle-carrying device 10 which includes a body 12 and a nozzle-carrying head 14 rotatably mounted on the body 12 around an axis A of rotation.

To this end, the body 12 delimits a cylindrical section forming a hub 16 around the axis A. The nozzle-carrying head 14, of a complementary annular form, is delimited by an inner annular face 18 which cooperates with the hub 16.

Furthermore, the nozzle-carrying head 14 is equipped with five outlet vents 20 which radially extend and which are regularly distributed around the axis A of rotation, to the periphery of the nozzle-carrying head 14.

Figure 3:
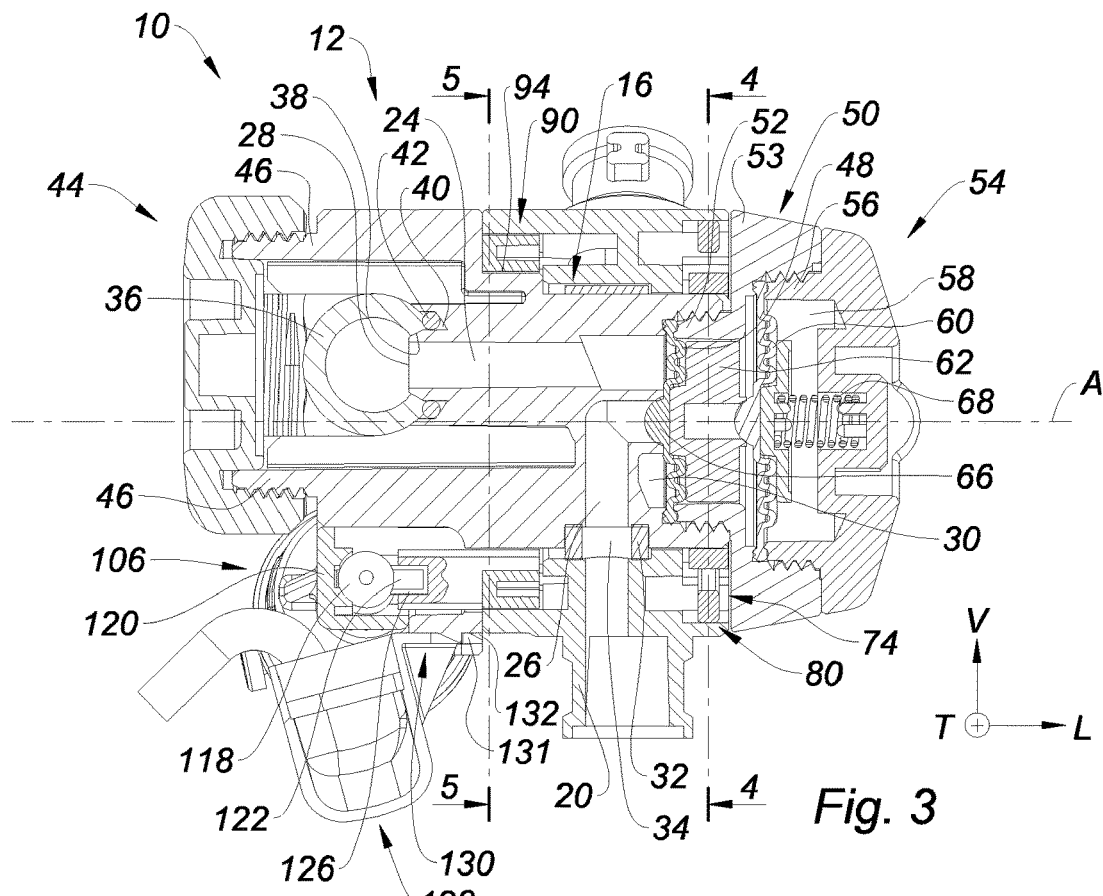
FIG. 3 is an axial sectional view, which illustrates the arrangement of the nozzle-carrying head on the body of the nozzle-carrying device of FIG. 1.

Each outlet vent 20, which is intended to be equipped with a nozzle (not shown) radially extending and opening into the inner annular face 18 of the nozzle-carrying head 14. Complementarily, as can be seen in FIG. 3, the body 12 has an inlet passage 24 and an outlet passage 26 of a fluid.

The inlet passage 24 axially extends along the axis A from an inlet orifice 28 to a first chamber 30.

The outlet passage 26 extends from the first chamber 30 via an axial section along the axis A, to the external face of the hub 16 via a radial section.

The first chamber 30 has a generally cylindrical shape around the axis A of rotation.

Advantageously, the nozzle-carrying device 10 includes a sealing ring 32 which is tightly mounted on the hub 16 and delimits a passage hole 34 arranged at the end of the outlet passage 26.

The nozzle-carrying device 10 is designed to be connected to a supply pipe 36, illustrated in FIG. 3, which is pierced by a hole 38 of an axis perpendicular to the axis of the pipe 36.

The edges of the hole 38 penetrate into a groove 40 of the body 12, which surrounds the inlet orifice 28 of the inlet passage 24 and which is provided with a sealing O-ring 42.

In addition, the body 12 forms two axially protruding lugs 46 on which a fastener 44 is screwed to clamp the supply pipe 36 against the O-ring 42.

According to another aspect, the nozzle-carrying device 10 includes an anti-drop device comprising a first circular blocking membrane 48 which extends radially and which delimits the first chamber 30.

To this end, the first membrane 48 is held by a first hollow tubular stopper 50 which is screwed onto the body 12.

The first stopper 50 includes a first threaded cylindrical clamping section 52 which sealingly axially plates the peripheral edge of the first membrane 48 on a shoulder of the body 12.

As can be seen in FIG. 3, the first stopper 50 includes an annular portion forming an axial abutment 53 which axially locks the nozzle-carrying head 14 on the hub 16.

Also, the anti-drip device is equipped with a second stopper 54 which includes a second threaded cylindrical clamping screw section 56 screwed on the first stopper 50, along the axis A of rotation, on an opposite side to the clamping section 52 of the first stopper 50.

The second stopper 54 delimits a second chamber 58 generally cylindrical-shaped around the axis A, which is delimited by a second membrane 60.

To this end, the second membrane 60 extends radially and is axially held by pinching between the clamping section 56 of the second stopper 54 and a shoulder formed on the first stopper 50.

In addition, a spacer 62 for stress distribution is arranged in the first stopper 50 and is axially interposed between the first membrane 48 and the second membrane 60 for transmitting an axial thrust stress between the membranes.

Figure 2:
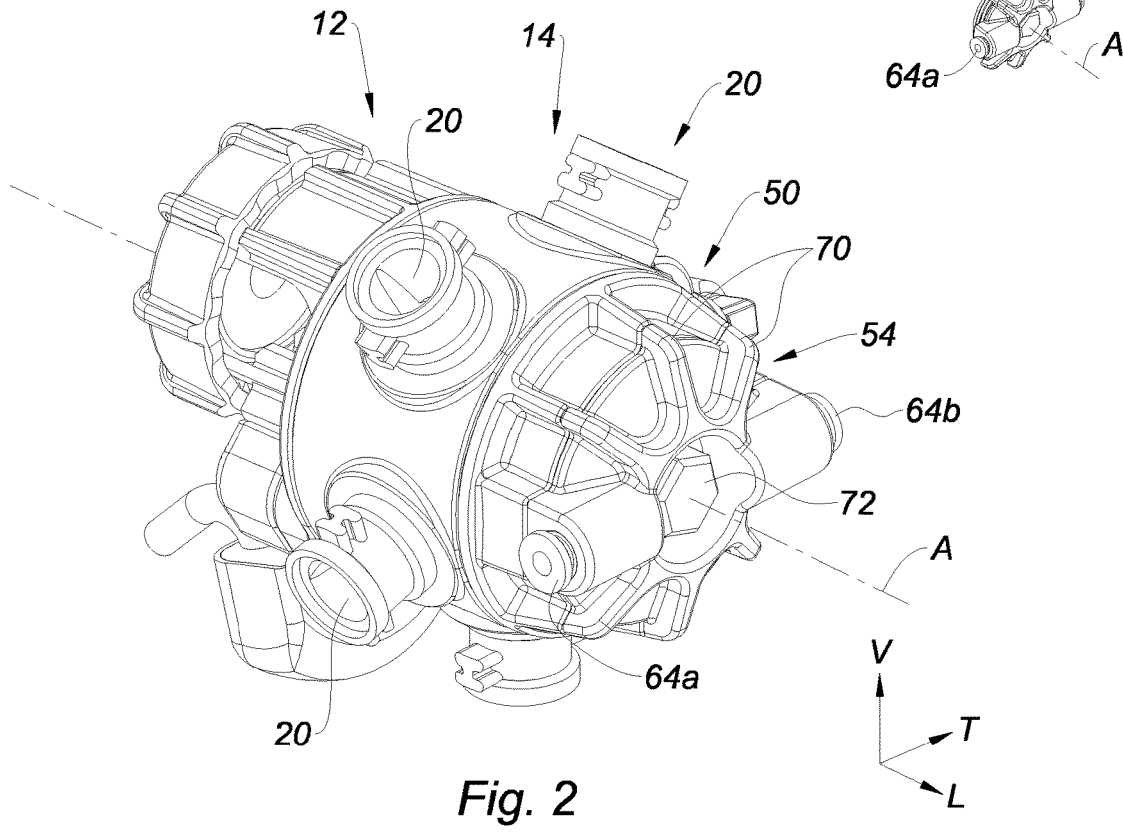
FIG. 2 is an assembled perspective view, which illustrates the nozzle-carrying device of FIG. 1.

As can be seen in FIGS. 1 and 2, the second stopper 54 is equipped with a first insert 64a forming a pneumatic fitting for supplying compressed air to the second chamber 58, and a second insert 64b forming a pneumatic fitting for the compressed air supply of an additional nozzle-carrying device (not shown), from the second chamber 58.

The compressed air is channeled through a duct (not shown) which is connected on the first insert 64a from a power source controlled by a control member (not shown), so as to make the pressure vary in the second chamber 58.

Also, the compressed air is ejected by another duct (not shown) which is connected on the second insert 64b and which is connected on an additional nozzle-carrying device, for example.

Such a design allows simultaneously controlling a plurality of nozzle-carrying devices 10 mounted in series.

By increasing the pressure in the second chamber 58, the second membrane 60 pushes the first membrane 48 by means of the spacer 62, and the first membrane 48 is driven in a closed position, shown in FIG. 3, wherein it interrupts communication between the inlet passage 24 and the outlet passage 26.

For this purpose, the first membrane 48 includes a central bead 66, which axially abuts against the end of the outlet passage 26 and interrupts communication between the outlet passage 26 and the first chamber 30.

Advantageously, the second membrane 60 has an area, or surface, greater than the area of the first membrane 48.

This feature allows, at equal pressure in the second chamber 58, exerting a greater force on the spacer 62 and the first membrane 48.

In addition, the anti-drop device includes a helical spring 68 which is axially interposed between the bottom of the second stopper 54 and the central portion of the second membrane 48, to exert axial pressure on the membrane in the closing direction of the first membrane 48.

As can be seen in FIG. 2, the second stopper 54 is equipped with a first grip 70 with radial fins for manually unscrewing the second stopper 54, and a second grip 72 of hexagonal shape suitable for cooperating with a tool allowing unscrewing the second stopper 54.

According to another aspect, the nozzle-carrying device 10 includes immobilizing means for rotatably immobilizing the nozzle-carrying head 14 on the body 12, around the axis A of rotation, in a plurality of predetermined positions.

Figure 4:
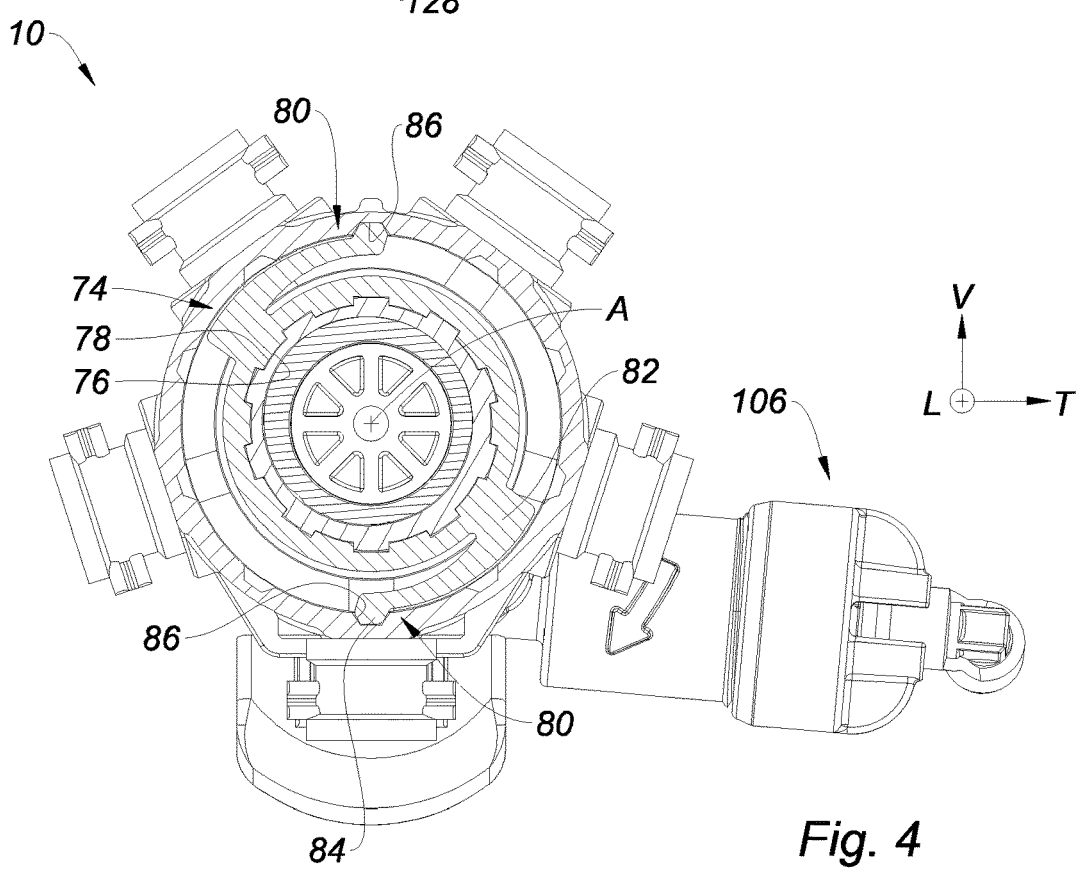
FIG. 4 is a radial sectional view along the line 4-4 of FIG. 3, which illustrates the immobilizing means of the nozzle-carrying head.

With reference to FIGS. 1 and 4, the immobilizing means include an annular immobilizing ring 74 which is securely mounted in rotation on the hub 16 of the body 12, around the axis A of rotation.

To this end, the immobilizing ring 74 includes an annular internal face delimiting a set of teeth 76 which cooperate with a set of complementary grooves 78 formed at the free end of the hub 16.

Thus, the set of teeth 76 and the associated grooves 78 form means for securing in rotation the immobilizing ring 74 on the hub 16 of the body 12, in form-fitting manner, these securing means being designed for dismantling the immobilizing ring 74 on the body 12 by axial sliding along the axis A.

In addition, the immobilizing ring 74 includes two diametrically opposite immobilizing catches 80, which are each generally circular arc shaped.

As can be seen in FIG. 4, each immobilizing catch 80 generally extends around the axis A of rotation from a first end forming a sub plate 82 linked to the external peripheral face of the immobilizing ring 74, to a second free end forming a radial protrusion 84.

The radial protrusion 84 of each immobilizing catch 80 is designed to cooperate with a set of complementary cavities 86 each delimited on the inner annular face 18 of the nozzle-carrying head 14, so as to immobilize the nozzle-carrying head 14 in each of its predetermined positions.

Each immobilizing catch 80, due to its longitudinal design, is elastically deformable in a radial manner, so that each protrusion 84 is radially retractable to allow rotation of the nozzle-carrying head 14 around the axis A of rotation, between two predetermined positions.

The cavities 86 are here ten and are regularly distributed around the axis A of rotation, so that the nozzle-carrying head 14 is suitable to be immobilized in ten predetermined positions angularly shifted by a tenth of a revolution.

These predetermined positions switch alternately and successively from a spraying position in which one of the outlet vents 20 is linked, or communicates, with the outlet passage 26 for the passage of the fluid, to a closed position in which the outlet vent 20 is angularly shifted and is no longer linked to the outlet passage 26.

In a non limiting manner, the immobilizing catches may be replaced by a ball-spring (not shown) which is movably mounted in a radial manner on the immobilizing ring 74 and which is designed to cooperate with a set of cavities 86.

According to another aspect, the nozzle-carrying device 10 is equipped with a mechanism for driving the nozzle-carrying head 14 in rotation.

Figure 5:
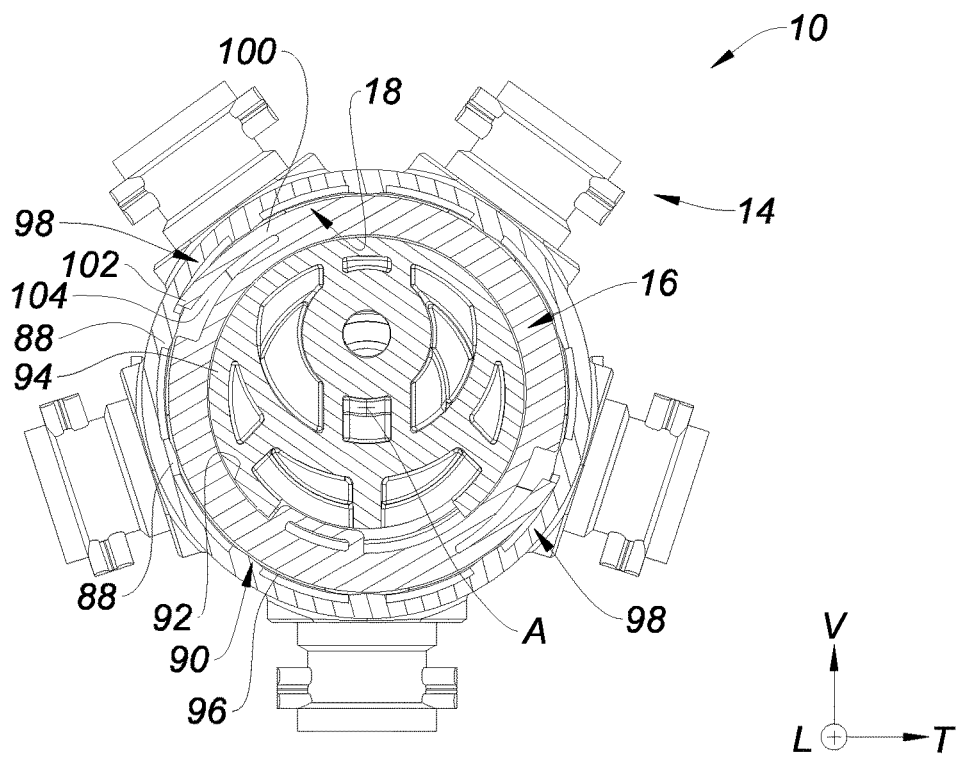
FIG. 5 is a radial sectional view along the line 5-5 of FIG. 3, which illustrates the oscillating drive element of the nozzle-carrying head in rotation.

According to FIG. 5, the drive mechanism includes ten radially protruding drive teeth 88, which are arranged on the inner annular face 18 of the nozzle-carrying head 14 and which are regularly distributed around the axis A, and angularly shifted by a tenth of a revolution.

In a complementary manner, the nozzle-carrying device 10 comprises an annular ring 90 forming a drive element which is mounted in oscillatory manner on the hub 16 of the body 12 around the axis A of rotation.

The ring 90 is delimited by an annular internal face 92 which cooperates with a complementary sleeve 94 of the hub 16 for oscillating the drive ring 90, and by an annular external face 96 in which are formed two retractable drive pawls 98.

Each pawl 98 generally has a circular arc shape which extends around the axis A of rotation, from a sub plate 100 linked on the ring 90, to a free end 102 suitable for pushing the drive teeth 88 successively around the axis A of rotation.

To this end, the free end 102 of each pawl 98 substantially protrudes radially outwards with respect to the external face 96 of the ring 90.

In addition, each pawl 98 is elastically deformable in a radial manner between a drive position, shown in FIG. 5, in which the pawl 98 is elastically returned and in which the pawl 98 is able to cooperate with one of the associated drive teeth 88, and a retracted position in which the pawl 98 is radially retracted in a housing 104, provided for this purpose, which is formed in the external face 96 of the ring 90.

Each pawl 98 is here integral with the ring 90, by injection of plastic material for example.

The ring 90, forming a drive element, is mounted in an oscillatory manner on the body 12, around the axis A of rotation, according to a pivoting forward motion during which each pawl 98 incrementally drives the nozzle-carrying head 14 to a predetermined position, by cooperating with one of the drive teeth 88, and a pivoting returning motion during which each pawl 98 is retracted into the housing 104 thereof in contact with the following drive tooth 88.

The drive of the ring 90 in oscillatory manner is made by means of a single-acting pneumatic cylinder 106.

The cylinder 106 includes a cylindrical body 108 in which a piston 110 divides the volume of the body 108 into a first chamber (not shown) supplied with compressed air via a pneumatic connection 112, and a second chamber (not shown) equipped with a return spring 116.

The piston 110 is linked on an actuating rod 118 which is movably driven along a direction perpendicular to the axis A of rotation, between an extended position, and a retracted position towards which the rod 118 is returned by the spring 116.

The free end of the rod 118 is housed in a protective casing 120.

The casing 120 also allows securing the cylinder 106 on the body 12, here by means of two screws (not shown).

In addition, the actuating rod 118 is equipped with a connecting catch 122 which extends parallel to the axis A and which has a free end cooperating with the drive ring 90.

To this end, the ring 90 includes a bearing 124 which extends axially and which delimits a housing 126, illustrated in the cutaway view on FIG. 3, in which the free end of the connecting catch 122 is received, so that the rod 118 of the cylinder 106 is movably connected on the drive ring 90.

The housing 126 has a substantially oblong shape longitudinally extending in a radial manner, for displacing the free end of the catch 122 during the driving of the ring 90.

The bearing 124 extends through a lumen 127, which is illustrated in FIG. 1, and which is arranged in the body 12.

Thus, the to-and-fro movement of the rod 118 of the cylinder 106 allows movably driving the drive ring 90 in oscillatory motion around the axis A.

Indeed, when the rod 118 of the cylinder 106 is driven from its retracted position, to its extended position, the ring 90 is pivotally driven around the axis A of rotation along a first rotation direction, the ring 90 in turn, driving the nozzle-carrying head 14 by a tenth of a revolution, from a predetermined position to the following predetermined position, by means of the two pawls 98.

Conversely, when the rod 118 of the cylinder 106 is driven from its extended position to its retracted position, the ring 90 is pivotally driven around the axis A along a second opposite rotation direction, each pawl 98 is then retracted to allow the returning of the ring 90 to its initial position without pivotally driving the nozzle-carrying head 14.

However, and in a non limiting manner, the driving in oscillatory motion of the ring 90 can be made by any type of actuator, such as an actuator of the type including a rod movably driven by a electromagnet, between a retracted position in which it is returned by a spring, and an extended position.

The drive mechanism is for example driven and remotely controlled by an operator using a control panel (not shown) which allows controlling the cylinder 106.

According to another aspect, the nozzle-carrying device 10 is equipped with a lighting device 128 designed to illuminate the spray spectrum of the fluid ejected from the nozzle of the nozzle-carrying head 14 which is supplied with fluid, that is to say, the nozzle which is linked on the outlet passage 26.

The lighting device 128 includes a set of electroluminescent diodes supplied with electricity by a battery.

Moreover, as can be seen in FIG. 1, the lighting device 128 includes an elastically deformable lug 130 provided with a spur 131, which cooperates with a complementary housing 132 (visible in FIG. 3) formed on the body 12, to allow a rapid and removable securing by form-fitting of the lighting device 128 on the body 12.

Finally, the nozzle-carrying device 10 is equipped with a cleaning element (not shown) of the first membrane 48.

The cleaning element is formed by a bulge which is arranged in the inlet passage 24, to cause the fluid to become turbulent by partially opposing its flow.

The thus created turbulence allows projecting the fluid on the first membrane 48 to clean and prevent clogging of the first membrane 48.

As described above, the nozzle-carrying device 10 according to the invention allows remotely rotationally driving the nozzle-carrying head 14 via an actuator, here, the cylinder 106.

Figure 6:
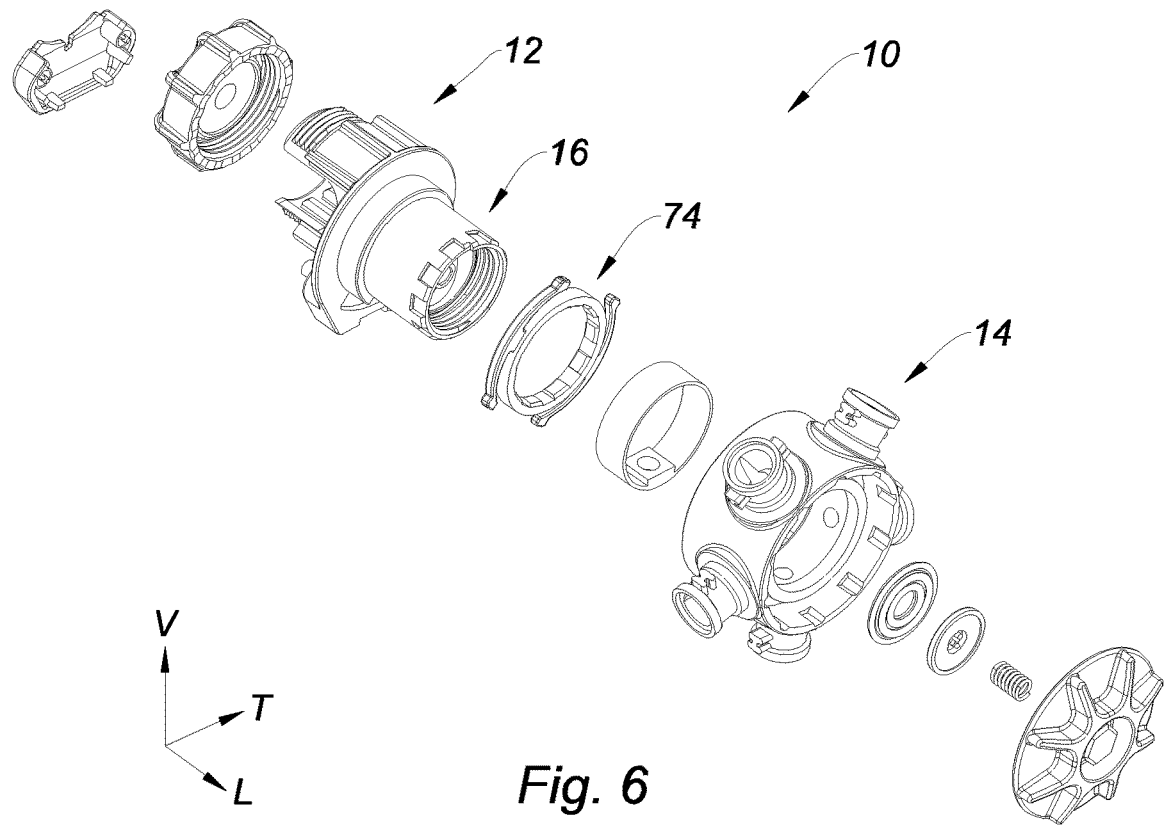
FIG. 6 is an exploded perspective view, which illustrates a variant including a nozzle-carrying head manually driven in rotation.

In addition, the nozzle-carrying device 10 is designed to be produced in a manual configuration, illustrated in FIG. 6, in which the device is devoid of a cylinder 106, the nozzle-carrying head 14 being manually driven by an operator.

In this manual configuration, it is noted that the nozzle-carrying device 10 is particularly devoid of the drive ring 10 and the associated cylinder 106.

However, other parts used for making the nozzle-carrying device 10 in its manual configuration are identical and interchangeable, thus avoiding manufacturing different additional parts.

Indeed, the parts which are mounted on the hub 16 of the body 12 such as the immobilizing ring 74, are suitable for being removed from the body 12 by axially sliding on the hub 16. According a variant which is not shown, the outlet passage 26, an associated seal member, the outlet vent 20, as well as the associated nozzle of the nozzle-carrying head 14, are parallel, or oblique with respect to the axis A, the outlet vents 20 and the associated nozzles of the nozzle-carrying head 14 each extend axially, so that the nozzle-carrying head forms a cylinder barrel, flat or cylindrical, rotatably mounted around the axis A of rotation, or along an oblique axis with respect to the axis A, the input vents being alternately put in communication with the outlet passage 24 26, and the seal thereof, by rotating the nozzle-carrying head 14.

The invention claimed is:

1. A nozzle-carrying device comprising:
a body has a fluid inlet passage and at least one outlet passage, and which includes a revolution section forming a hub that extends around an axis of rotation,
a nozzle-carrying head is rotatably mounted on the hub of the body around the axis of rotation, and is configured to simultaneously carry at least two nozzles, the nozzle-carrying head comprising a plurality of outlet vents disposed thereon and each outlet vent of the plurality of outlet vents comprises a nozzle of the at least two nozzles, and
an immobilizing component configured for rotatably immobilizing the nozzle-carrying head on the body in a plurality of predetermined positions, the plurality of predetermined positions switching alternately and successively from a spraying position in which one of the plurality of outlet vents is linked to said outlet passage, downstream of said outlet passage, to a closed position in which said outlet vent of the plurality of outlet vents is angularly shifted and is no longer linked to the outlet passage, wherein the nozzle-carrying device comprises a mechanism for driving the nozzle-carrying head in rotation, wherein the mechanism comprising:
  a plurality of drive teeth which are regularly arranged around the axis of rotation on the nozzle-carrying head,
  a drive element comprises at least one retractable drive pawl which has a free end suitable for successively pushing the plurality of drive teeth, the drive element being mounted in oscillatory manner on the body, around the axis of rotation, according to a forward motion during the at least one retractable drive pawl incrementally drives the nozzle-carrying head to a predetermined position of the plurality of predetermined positions by cooperation with one of the plurality of drive teeth, and a return motion during which the at least one retractable pawl is retracted,
  an actuator including an actuating rod which is movably connected on the drive element for driving the drive element in oscillatory motion.

2. The nozzle-carrying device according to claim 1, wherein the actuator is a cylinder which drives in displacement the actuating rod along a direction perpendicular to the axis of rotation between an extended position and a retracted position, the actuating rod comprises a connecting catch, wherein the connecting catch extends parallel to the axis of rotation and has a free end cooperating with a complementary housing delimited by the drive element, so as to drive the drive element in oscillatory displacement via a back and forth motion of the actuating rod.

3. The nozzle-carrying device according to claim 1, wherein the drive element has a shape of an annular ring which is removeably mounted in oscillatory manner on the hub of the body, around the axis of rotation.

4. The nozzle-carrying device according to claim 1, wherein the pawl has a circular arc shape which extends around the axis of rotation, from an elastically deformable sub plate, to a free end suitable for successively pushing the plurality of drive teeth, around the axis of rotation.

5. The nozzle-carrying device according to claim 1, wherein the immobilizing component include an annular immobilizing ring including at least one immobilizing element comprises a radial protrusion designed to cooperate with a set of complementary cavities, each of the set of complementary cavities delimited on the nozzle-carrying head so as to incrementally immobilize said head in the plurality of predetermined positions, the radial protrusion being radially retractable for allowing rotation of the nozzle-carrying head between two predetermined positions of the plurality of predetermined positions.

6. The nozzle-carrying device according to claim 5, wherein the annular immobilizing ring includes a set of teeth and grooves in rotation on the hub of the body, around the axis of rotation, in form-fitting manner, and wherein said set of teeth and grooves are configured to allow dismantling the annular immobilizing ring on the body.

7. The nozzle-carrying device according to claim 1, wherein it includes an anti-drop device comprising:
  a first chamber in the inlet passage and the outlet passage open into each other,
  a second chamber juxtaposed to the first chamber,
  a first blocking membrane configured to be driven in a closed position in which the first blocking membrane interrupts communication between the inlet passage and the outlet passage, and a second blocking membrane which abuts with the first blocking membrane and wherein the second blocking membrane has an area larger than an area of the first blocking membrane, an assembly constituted by the first blocking membrane and the second blocking membrane being interposed between the first chamber and the second chamber.

8. The nozzle-carrying device according to claim 7, further comprising:
  a first tubular stopper is screwed onto the body and the first tubular stopper delimits a first annular clamping section axially plating a peripheral edge of the first blocking membrane against a shoulder formed in the body, and an axial abutment axially blocking the nozzle-carrying head on the body,
  a second blind stopper is screwed onto the first tubular stopper and the second blind stopper includes a second annular clamping section axially plating a peripheral edge of the second blocking membrane against a shoulder formed in the first tubular stopper.

9. The nozzle-carrying device according to claim 8, wherein the second blind stopper comprises a first grip allowing for the second annular stopper manual unscrewing, and a second grip suitable for cooperating with a tool for unscrewing the second blind stopper.

10. The nozzle-carrying device according to claim 8, wherein the second blind stopper includes a first insert forming connection for supplying fluid under pressure to the second chamber, and a second insert forming connection for supplying fluid under pressure to an additional nozzle-carrying device from the second blind chamber.

11. The nozzle-carrying device according to claim 1, further comprising a light configured to illuminate at least a spray spectrum of fluid ejected by the nozzle-carrying device.

* * * * *